(12) United States Patent
Rabinovich et al.

(10) Patent No.: US 8,112,227 B2
(45) Date of Patent: Feb. 7, 2012

(54) PROCESSING OF MULTI-COMPONENT INDUCTION MEASUREMENTS IN A BIAXIALLY ANISOTROPIC FORMATION

(75) Inventors: Michael B. Rabinovich, Houston, TX (US); Leonty A. Tabarovsky, Cypress, TX (US); Vladimir S. Mogilatov, Novosibirsk (RU)

(73) Assignee: Baker Hughes Incorporated, Houston, TX (US)

(*) Notice: Subject to any disclaimer, the term of this patent is extended or adjusted under 35 U.S.C. 154(b) by 533 days.

(21) Appl. No.: 12/120,839

(22) Filed: May 15, 2008

(65) Prior Publication Data

US 2008/0215243 A1 Sep. 4, 2008

Related U.S. Application Data

(63) Continuation-in-part of application No. 10/867,619, filed on Jun. 15, 2004, now Pat. No. 7,392,137.

(51) Int. Cl.
*G01V 1/40* (2006.01)
*G01V 3/00* (2006.01)

(52) U.S. Cl. .......................................... 702/7; 324/335

(58) Field of Classification Search .............. 702/7, 1–2, 702/6, 9–11, 14, 16, 65, 75, 150–151, 154; 324/323, 332–335, 337–339, 344–346, 348, 324/354–355, 357; 175/45; 166/244.1, 254.1, 166/254.2; 367/14, 21, 25, 32, 73; 703/2, 703/5, 10
See application file for complete search history.

(56) References Cited

U.S. PATENT DOCUMENTS

| | | | |
|---|---|---|---|
| 4,837,517 A | | 6/1989 | Barber |
| 5,157,605 A | | 10/1992 | Chandler et al. |
| 5,329,448 A | | 7/1994 | Rosthal |
| 5,542,761 A | | 8/1996 | Dedoes |
| 5,656,930 A | | 8/1997 | Hagiwara |
| 5,703,773 A | * | 12/1997 | Tabarovsky et al. ............... 702/7 |
| 5,781,436 A | | 7/1998 | Forgang et al. |
| 5,999,883 A | | 12/1999 | Gupta et al. |
| 6,044,325 A | | 3/2000 | Chakravarthy et al. |
| 6,092,024 A | | 7/2000 | Wu |
| 6,147,496 A | | 11/2000 | Strack et al. |
| 6,393,364 B1 | | 5/2002 | Gao et al. |
| 6,574,562 B2 | * | 6/2003 | Tabarovsky et al. ............... 702/7 |
| 6,636,045 B2 | | 10/2003 | Tabarovsky et al. |
| 6,643,589 B2 | | 11/2003 | Zhang et al. |
| 6,711,502 B2 | | 3/2004 | Mollison et al. |
| 6,760,666 B2 | * | 7/2004 | Hagiwara ........................... 702/7 |
| 6,819,111 B2 | * | 11/2004 | Fanini et al. .................... 324/339 |
| 7,317,991 B2 | | 1/2008 | Wang et al. |
| 7,392,137 B2 | * | 6/2008 | Tabarovsky et al. ............... 702/7 |

(Continued)

OTHER PUBLICATIONS

Tang, Y., Modeling and Inversion of Multicomponent Induction Logs in a Biaxial Anisotropic Formation, May 2008, Ph. D. Thesis, Electrical and Computer Engineering, University of Houston, 119 pp.*

(Continued)

*Primary Examiner* — Michael Nghiem
*Assistant Examiner* — Toan Le
(74) *Attorney, Agent, or Firm* — Mossman Kumar & Tyler PC (57) ABSTRACT

Measurements made by a multi-component logging tool in a borehole are inverted to obtain three principal resistivities (or conductivities) and three associated angles of a bi-axially symmetric formation traversed by the borehole.

17 Claims, 3 Drawing Sheets

U.S. PATENT DOCUMENTS

| | | | |
|---|---|---|---|
| 7,496,451 B2 * | 2/2009 | Fang et al. | 702/7 |
| 7,629,791 B2 * | 12/2009 | Bespalov et al. | 324/339 |
| 7,657,375 B2 * | 2/2010 | Wang et al. | 702/6 |
| 2003/0028324 A1 | 2/2003 | Xiao et al. | |
| 2003/0055565 A1 | 3/2003 | Omeragic | |
| 2003/0057950 A1 | 3/2003 | Gao et al. | |
| 2003/0105591 A1 | 6/2003 | Hagiwara | |
| 2003/0146752 A1 | 8/2003 | Gianzero et al. | |
| 2004/0059513 A1 | 3/2004 | Bittar et al. | |
| 2004/0108853 A1 | 6/2004 | Rosthal | |
| 2004/0183583 A1 | 9/2004 | Mizuno | |
| 2005/0274512 A1 | 12/2005 | Tabarovsky et al. | |
| 2006/0161350 A1 | 7/2006 | Wang et al. | |

OTHER PUBLICATIONS

Tang et al., Multicomponent Induction Response in a Biaxially Anisotropic Formation, 2007, SEG/San Antonio 2007 Annual Meeting, pp. 678-682.*

M. Rabinovich et al., Processing Multi-Component Induction Data for Formation Dip and Azimuth in Anisotropy Formations, SPWLA 46th Annual Logging Symposium, Jun. 26-29, 2005, pp. 1-14.

L. Yu et al., The Reduction of Near Zone on the Multi-component Induction Loggin Tool, SPE 84097, SPE Annual Technical Conference and Exhibition, Denver, Colorardo, Oct. 5-8, 2003, pp. 1-6.

M. Rabinovich et al., Enhanced Anisotropy From Joint Processing of Multi-component and Multi-array Induction Tools, SPWLA 42nd Annual Logging Symposium, Jun. 17-20, 2001, pp. 1-10.

A. G. Nekut, Anisotropy induction logging, Geophysics, vol. 59, No. 3 (Mar. 1994), pp, 345-350.

Yang, Y., "Modeling and Inversion of Multicomponent Induction Logs in a Biaxial Anisotropic Formation," published Sep. 30, 2008, Copyright Reg. No. TX0006650324, Nov. 13, 2008.

* cited by examiner

PROCESSING OF MULTI-COMPONENT INDUCTION MEASUREMENTS IN A BIAXIALLY ANISOTROPIC FORMATION

CROSS-REFERENCES TO RELATED APPLICATIONS

This application is a continuation-in-part of U.S. patent application Ser. No. 10/867,619 filed Jun. 15, 2004 of Tabarovsky et al, now U.S. Pat. No. 7,392,137.

BACKGROUND OF THE DISCLOSURE

1. Field of the Disclosure

The disclosure is related generally to the field of interpretation of measurements made by well logging instruments for the purpose of determining the properties of earth formations. More specifically, the disclosure is related to a method of interpreting multi-component resistivity measurements made in a bi-axially anisotropic medium.

2. Background of the Art

Electromagnetic induction and wave propagation logging tools are commonly used for determination of electrical properties of formations surrounding a borehole. These logging tools give measurements of apparent resistivity (or conductivity) of the formation that when properly interpreted are diagnostic of the petrophysical properties of the formation and the fluids therein.

It is well known that certain earth formations consist of thin layers of electrically conductive materials interleaved with thin layers of substantially non-conductive material. The response of the typical electromagnetic induction resistivity well logging instrument will be largely dependent on the conductivity of the conductive layers when the layers are substantially parallel to the flow path of the eddy currents. The substantially non-conductive layers will contribute only a small amount to the overall response of the instrument and therefore their presence will typically be masked by the presence of the conductive layers. The non-conductive layers, however, are the ones which are typically hydrocarbon-bearing and are of the most interest to the instrument user. Some earth formations which might be of commercial interest therefore may be overlooked by interpreting a well log made using the electromagnetic induction resistivity well logging instruments known in the art. Such formations are characterized by transverse isotropy and two resistivities, a horizontal resistivity $R_h$ in a plane parallel to the bedding and a vertical resistivity $R_v$ in a direction perpendicular to the bedding.

U.S. Pat. No. 5,999,883 issued to Gupta et al, (the "Gupta patent"), the contents of which are fully incorporated here by reference, discloses a method for determination of an initial estimate of the horizontal and vertical conductivity of anisotropic earth formations. Electromagnetic induction signals induced by induction transmitters oriented along three mutually orthogonal axes are measured. One of the mutually orthogonal axes is substantially parallel to a logging instrument axis. The electromagnetic induction signals are measured using first receivers each having a magnetic moment parallel to one of the orthogonal axes and using second receivers each having a magnetic moment perpendicular to a one of the orthogonal axes which is also perpendicular to the instrument axis. A relative angle of rotation of the perpendicular one of the orthogonal axes is calculated from the receiver signals measured perpendicular to the instrument axis. An intermediate measurement tensor is calculated by rotating magnitudes of the receiver signals through a negative of the angle of rotation. A relative angle of inclination of one of the orthogonal axes which is parallel to the axis of the instrument is calculated, from the rotated magnitudes, with respect to a direction of the vertical conductivity. The rotated magnitudes are rotated through a negative of the angle of inclination. Horizontal conductivity is calculated from the magnitudes of the receiver signals after the second step of rotation. An anisotropy parameter is calculated from the receiver signal magnitudes after the second step of rotation. Vertical conductivity is calculated from the horizontal conductivity and the anisotropy parameter.

U.S. Pat. No. 6,643,589 to Zhang et al., having the same assignee as the present application and the contents of which are incorporated herein by reference, teaches a method for the simultaneous inversion of measurements made by a multi-component logging tool to obtain anisotropic resistivities and formation inclination angle and azimuth. A model that includes horizontal and vertical resistivities is used to generate a simulated tool response. An iterative solution that gives an improved match between the model output and the field observations is obtained using a global objective function. The global objective function is defined as a sum of a data objective function (difference between the model output and the observed data) and a model objective function that stabilizes the inversion procedure by placing a penalty on large changes in the model at each iteration.

U.S. Pat. No. 6,574,562 to Tabarovsky et al. teaches a method of determination of horizontal and vertical conductivities of subsurface formations using a combination of data acquired with a multi-component induction logging tool and data acquired with a conventional high definition induction logging tool. The multi-component data are acquired at a plurality of frequencies and a skin-effect correction is applied. An isotropic resistivity model is derived from HDIL data (multiple frequency or multiple spacing). This may be done either by inversion or by focusing. Using a forward modeling program, expected values of the transverse components of the multi-component data are derived. A skin-effect correction is applied to the model output. Differences between the focused model output and the focused acquired data are indicative of anisotropy and this difference is used to derive an anisotropy factor. Computationally, the method in Tabarovsky is faster than that in Zhang.

The methods discussed in Tabarovsky and in Zhang are effective in analyzing transversely isotropic (TI) media. In a TI medium, resistivity along a symmetry axis is different from resistivity in any direction in a plane orthogonal to the symmetry axis. Certain types of hydrocarbon reservoirs include cross-bedding wherein within geologic markers (or beds) there is, in addition, fine bedding (cross-bedding) with a different dip than the main bedding. Cross bedding typically occur in three major environments: (1) aeolian, (2) subaqueous delta, and (3) river channels. Due to variations in grain size, cementation, water saturation and other factors, cross-bedding usually displays resistivity anisotropy. On a fine scale, the resistivity perpendicular to the cross-bedding planes is in general higher than that parallel to the cross-bedding plane. Accurate reservoir evaluation and description should consider the resistivity dependence with direction. U.S. Pat. No. 7,317,991 to Wang, having the same assignee as the present application and the contents of which are incorporated herein by reference, teaches a method of evaluating such a cross-bedding formation via an approximate, bi-axially anisotropic model. A weak anisotropy approximation is used by Wang. It would be desirable to have a method of evaluating bi-axially anisotropic earth formations without making a weak anisotropy approximation. The present disclosure addresses this need.

SUMMARY OF THE DISCLOSURE

One embodiment of the disclosure is a method of evaluating a bi-axially anisotropic earth formation. The method includes making induction resistivity measurements at a plurality of frequencies. Multifrequency focusing is applied to the measurements at the plurality of frequencies to define elements of a tensor of multifrequency focused (MFF) measurements. The tensor of MFF measurements is processed to obtain an estimate of (A) least one angle relating a tool-based coordinate system to a principal coordinate system of the earth formation, and (B) at least one conductivity of the bi-axially anisotropic earth formation. The at least one angle and the at least one conductivity may be recorded on a suitable medium.

Another embodiment of the disclosure is an apparatus for evaluating a bi-axially anisotropic earth formation. The apparatus includes an induction resistivity instrument conveyed in a borehole and configured to make measurements at a plurality of frequencies, and a processor configured to apply multifrequency focusing to the measurements at the plurality of frequencies to define elements of a tensor of multifrequency focused (MFF) measurements. The process is further configured to process the tensor of MFF measurements to obtain an estimate of (A) least one angle relating a tool-based coordinate system to a principal coordinate system of the earth formation, and (B) at least one conductivity of the bi-axially anisotropic earth formation, and record the at least one angle and the at least one conductivity on a suitable medium.

Another embodiment of the disclosure is a computer-readable medium for use with apparatus for evaluating a bi-axially anisotropic earth formation. The apparatus includes an induction resistivity instrument conveyed in a borehole, the instrument configured to make measurements at a plurality of frequencies. The medium including instructions which enable a processor to apply multifrequency focusing to the measurements at the plurality of frequencies to define elements of a tensor of multifrequency focused (MFF) measurements, process the tensor of MFF measurements to obtain an estimate of (A) least one angle relating a tool-based coordinate system to a principal coordinate system of the earth formation, and (B) at least one conductivity of the bi-axially anisotropic earth formation, and record the at least one angle and the at least one conductivity on a suitable medium.

BRIEF DESCRIPTION OF THE FIGURES

The present disclosure is best understood with reference to the following figures in which like numbers refer to like components and in which.

DETAILED DESCRIPTION OF THE DISCLOSURE

Figure 1:
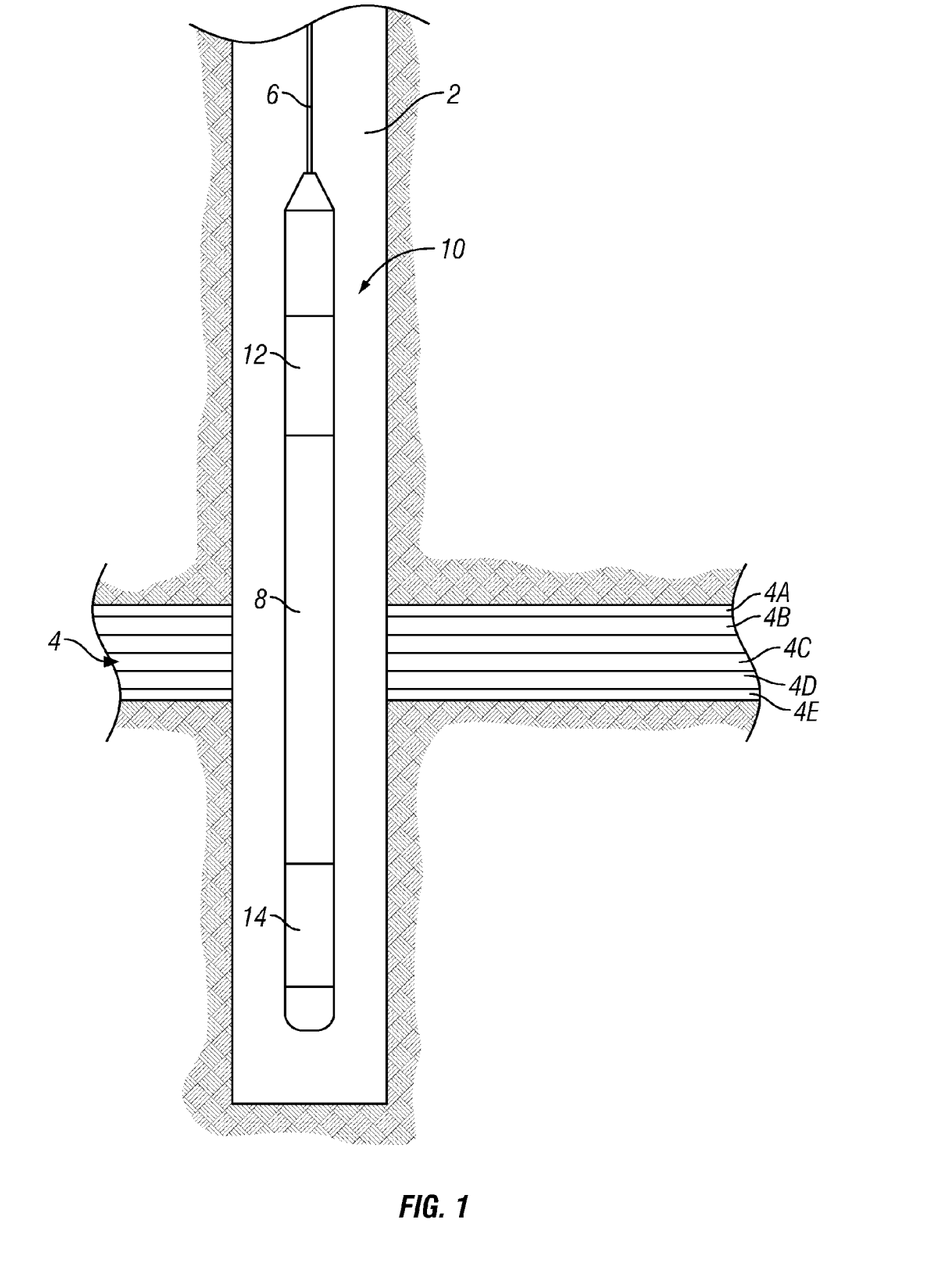
FIG. 1 shows an induction instrument disposed in a wellbore penetrating an earth formation.

Referring now to FIG. 1, an electromagnetic induction well logging instrument 10 is shown disposed in a wellbore 2 drilled through earth formations. The earth formations are shown generally at 4. The instrument 10 can be lowered into and withdrawn from the wellbore 2 by means of an armored electrical cable 6 or similar conveyance known in the art. The instrument 10 can be assembled from three subsections: an auxiliary electronics unit 14 disposed at one end of the instrument 10; a coil mandrel unit 8 attached to the auxiliary electronics unit 14; and a receiver/signal processing/telemetry electronics unit 12 attached to the other end of the coil mandrel unit 8, this unit 12 typically being attached to the cable 6.

The coil mandrel unit 8 includes induction transmitter and receiver coils, as will be further explained, for inducing electromagnetic fields in the earth formations 4 and for receiving voltage signals induced by eddy currents flowing in the earth formations 4 as a result of the electromagnetic fields induced therein.

The auxiliary electronics unit 14 can include a signal generator and power amplifiers (not shown) to cause alternating currents of selected frequencies to flow through transmitter coils in the coil mandrel unit 8.

The receiver/signal processing/telemetry electronics unit 12 can include receiver circuits (not shown) for detecting voltages induced in receiver coils in the coil mandrel unit 8, and circuits for processing these received voltages (not shown) into signals representative of the conductivities of various layers, shown as 4A through 4F of the earth formations 4. As a matter of convenience the receiver/signal processing/telemetry electronics unit 12 can include signal telemetry to transmit the conductivity-related signals to the earth's surface along the cable 6 for further processing, or alternatively can store the conductivity related signals in an appropriate recording device (not shown) for processing after the instrument 10 is withdrawn from the wellbore 2.

Figure 2:
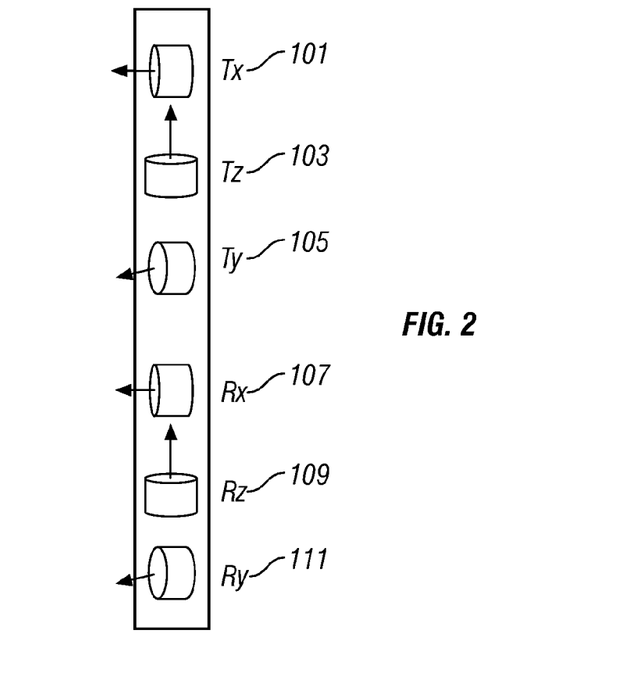
FIG. 2 shows the arrangement of transmitter and receiver coils in an embodiment of the present disclosure marketed under the name 3DExplorer™.

Referring to FIG. 2, the configuration of transmitter and receiver coils in an embodiment of the 3DEX® induction logging instrument of Baker Hughes is shown. Three orthogonal transmitters 101, 103 and 105 that are referred to as the $T_x$, $T_z$, and $T_y$ transmitters are shown (the z-axis is the longitudinal axis of the tool). Corresponding to the transmitters 101, 103 and 105 are associated receivers 107, 109 and 111, referred to as the $R_x$, $R_z$, and $R_y$ receivers, for measuring the corresponding magnetic fields. In one mode of operation of the tool, the $H_{xx}$, $H_{yy}$, $H_{zz}$, $H_{xy}$, and $H_{xz}$ components are measured, though other components may also be used.

The current density J in a medium is related to the electric field E by the relationship J=σE, where σ is the conductivity tensor. The conductivity tensor is a positive-definite symmetric second-rank tensor. In a bi-axially anisotropic medium, the conductivity tensor in the principal coordinate system is diagonal and denoted by:

$$\hat{\sigma} = \begin{pmatrix} \sigma_x & 0 & 0 \\ 0 & \sigma_y & 0 \\ 0 & 0 & \sigma_z \end{pmatrix}. \quad (1)$$

Figure 3:
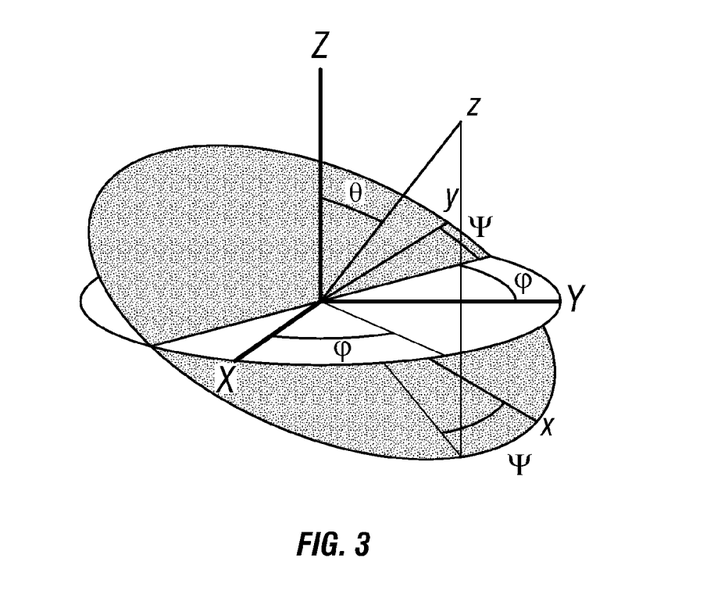
FIG. 3 shows the rotation of coordinates between the principal axes of a bi-axially anisotropic medium and the tool coordinate system.

Nekut discusses a method of transient electromagnetic logging aimed at identifying this matrix. The method discussed in Nekut relies on measurement of the asymptotic (after a long time interval) transient decay. These asymptotic signals are weak and hence accurate measurement of the conductivity is difficult. The present method does not rely on such transient measurements. We assume that a multi-component induction logging tool acquires, at every depth a matrix of magnetic tool responses in the tool coordinate system (x',y',z') denoted by:

$$\hat{H}' = \begin{pmatrix} h_{x'x'} & h_{x'y'} & h_{x'z'} \\ h_{y'x'} & h_{y'y'} & h_{y'z'} \\ h_{z'x'} & h_{z'y'} & h_{z'z'} \end{pmatrix}, \quad (2)$$

where the first index indicates the orientation of a transmitter and a second index specifies the orientation of a receiver. For clarity, we consider a thick anisotropic layer. In this case an arbitrary position of the tool can be fully described with the three Euler angles: tool azimuth $\phi$, relative dip $\theta$, and tool rotation $\psi$. This is schematically illustrated in FIG. 3. The tool coordinate system is shown by (X, Y, Z). The formation coordinate system is shown by (x,y,z) where, for example, the conductivities along the three axes are as indicated by the equation (1).

It can be shown that matrix (2) cannot be diagonalized if the relative dip $\theta$ is not zero. In special cases, when the tool azimuth angle $\phi$ is 0° or 180°, in the principal coordinate system the matrix (2) has the following structure:

$$\hat{H} = \begin{pmatrix} h_{xx} & 0 & h_{xz} \\ 0 & h_{yy} & 0 \\ h_{zx} & 0 & h_{zz} \end{pmatrix}, \quad (3)$$

or, when the tool azimuth $\phi$ is 90° or 270°, by $$\hat{H} = \begin{pmatrix} h_{xx} & 0 & 0 \\ 0 & h_{yy} & h_{yz} \\ 0 & h_{zy} & h_{zz} \end{pmatrix}. \quad (4)$$

In all other situations when the relative dip is not zero, even in the principal coordinate system, the matrix (2) is full, and will generally have 9 non-zero elements.

The situation becomes different when a multi-frequency focusing is applied to the magnetic matrix to extract terms proportional to $\omega^{3/2}$. This is discussed in U.S. Pat. No. 7,392,137 to Tabarovsky et al., having the same assignee as the present disclosure and the contents of which are incorporated by reference. In a deviated well (non-zero relative dip) the matrix of MFF components looks similar to magnetic matrix.

$$\hat{H}'_{MFF} = \begin{pmatrix} \tilde{h}_{x'x'} & \tilde{h}_{x'y'} & \tilde{h}_{x'z'} \\ \tilde{h}_{y'x'} & \tilde{h}_{y'y'} & \tilde{h}_{y'z'} \\ \tilde{h}_{z'x'} & \tilde{h}_{z'y'} & \tilde{h}_{z'z'} \end{pmatrix}. \quad (5)$$

It can be shown that in deviated wells in the principal coordinate system the components of the multi-frequency focused magnetic field become diagonalized:

$$\hat{H}_{MFF} = \begin{pmatrix} \tilde{h}_{xx} & 0 & 0 \\ 0 & \tilde{h}_{yy} & 0 \\ 0 & 0 & \tilde{h}_{zz} \end{pmatrix}. \quad (6)$$

We can express the MFF matrix in the tool coordinate system (5) through the MFF matrix in the principal coordinate system (6) using the tensor rotation rule $$\hat{H}'_{MFF} = \hat{R}\hat{H}_{MFF}\hat{R}^T \quad (7).$$

The rotation matrix R can be obtained from the Euler's rotation theorem $$\hat{R} = \hat{R}_z(\psi)\cdot\hat{R}_y(\theta)\cdot\hat{R}_z(\phi), \quad (8)$$

where $$\hat{R}_z(\psi) = \begin{pmatrix} c_\psi & s_\psi & 0 \\ -s_\psi & c_\psi & 0 \\ 0 & 0 & 1 \end{pmatrix}, \quad (9)$$

$$\hat{R}_y(\theta) = \begin{pmatrix} c_\theta & 0 & -s_\theta \\ 0 & 1 & 0 \\ s_\theta & 0 & c_\theta \end{pmatrix},$$

$$\hat{R}_z(\phi) = \begin{pmatrix} c_\phi & s_\phi & 0 \\ -s_\phi & c_\phi & 0 \\ 0 & 0 & 1 \end{pmatrix}.$$

In (9), $c_{[\cdot]}$ and $s_{[\cdot]}$ refer to the cosine and sine of the argument [.]. Substituting (9) into (8) we can rewrite $$\hat{R}(\phi,\theta,\psi) = \begin{pmatrix} r_{11} & r_{12} & r_{13} \\ r_{21} & r_{22} & r_{23} \\ r_{31} & r_{32} & r_{33} \end{pmatrix} \quad (10)$$

$$= \begin{pmatrix} c_\phi c_\theta c_\psi - s_\phi s_\psi & s_\phi c_\theta c_\psi - c_\phi s_\psi & -s_\theta c_\psi \\ -c_\phi c_\theta s_\psi - s_\phi c_\psi & -s_\phi c_\theta s_\psi + c_\phi c_\psi & s_\theta s_\psi \\ c_\phi s_\theta & s_\phi s_\theta & c_\theta \end{pmatrix}.$$

Using equations (6), (7), and (10) we can express the measured MFF components into tool coordinate system as $$\begin{pmatrix} \tilde{h}_{x'x'} \\ \tilde{h}_{x'y'} \\ \tilde{h}_{x'z'} \\ \tilde{h}_{y'x'} \\ \tilde{h}_{y'y'} \\ \tilde{h}_{y'z'} \\ \tilde{h}_{z'x'} \\ \tilde{h}_{z'y'} \\ \tilde{h}_{z'z'} \end{pmatrix} = \begin{pmatrix} r_{11}^2 & r_{12}^2 & r_{13}^2 \\ r_{11}\cdot r_{21} & r_{12}\cdot r_{22} & r_{13}\cdot r_{23} \\ r_{11}\cdot r_{31} & r_{12}\cdot r_{32} & r_{13}\cdot r_{33} \\ r_{11}\cdot r_{21} & r_{12}\cdot r_{22} & r_{13}\cdot r_{23} \\ r_{21}^2 & r_{22}^2 & r_{23}^2 \\ r_{21}\cdot r_{31} & r_{22}\cdot r_{32} & r_{23}\cdot r_{33} \\ r_{11}\cdot r_{31} & r_{12}\cdot r_{32} & r_{13}\cdot r_{33} \\ r_{21}\cdot r_{31} & r_{22}\cdot r_{32} & r_{23}\cdot r_{33} \\ r_{31}^2 & r_{32}^2 & r_{33}^2 \end{pmatrix} \begin{pmatrix} \tilde{h}_{xx} \\ \tilde{h}_{yy} \\ \tilde{h}_{zz} \end{pmatrix}, \quad (11).$$

As noted above, the terms $\tilde{h}_{xx}$, $\tilde{h}_{yy}$ and $\tilde{h}_{zz}$ are the principal components of multi-frequency focused measurements in the principal coordinate system. The terms on the left-hand side of the equation are the nine elements of the tensor of multi-frequency focused measurements in the tool co-ordinate system.

Looking at equations (10) and (11) we can observe that in the right-hand side we have 6 unknowns: three principal components $\tilde{h}_{xx}$, $\tilde{h}_{yy}$, $\tilde{h}_{zz}$, and three angles $\phi$, $\theta$, $\psi$. Also, we can notice that even we have 9 measurements only 6 of them are independent: $\tilde{h}_{xy} = \tilde{h}_{yx}$; $\tilde{h}_{xz} = \tilde{h}_{zx}$; $\tilde{h}_{yz} = \tilde{h}_{zy}$. Since the equation (11) is correct at every logging depth, one embodiment of the disclosure uses the method described next to provide maximum stability and robustness in recovering the unknowns. The method is similar to the method used for transverse-isotropic models described in U.S. Pat. No. 6,636,045 to Tabarovsky et al.

Figure 4:
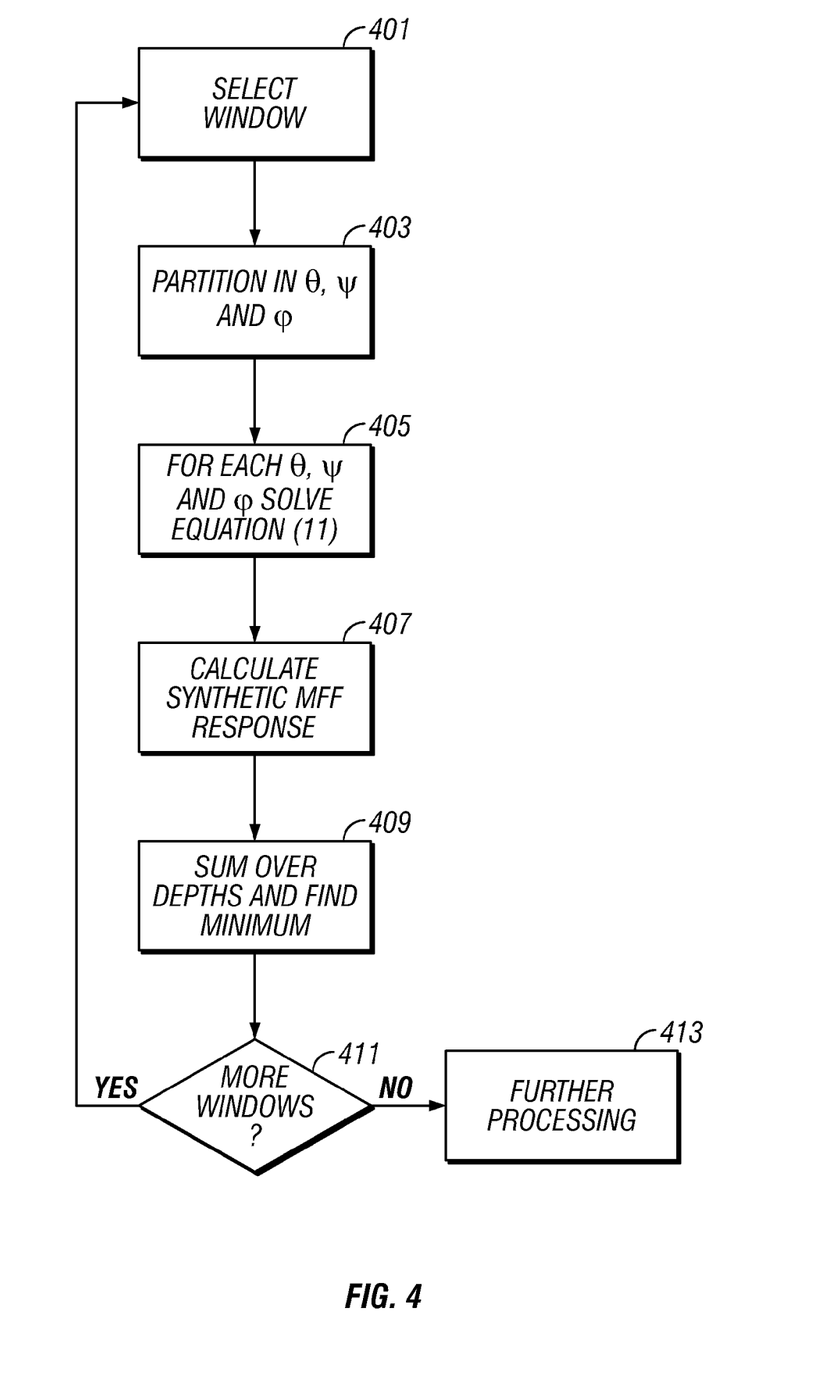
FIG. 4 is a flow chart showing some steps of the method of the present disclosure.

Turning, now to FIG. 4, the entire processing interval (after the multifrequency focusing) is divided into relatively small windows and a window for processing 401 is selected. In one embodiment, it is assumed that the relative dip, azimuth and rotation angles are constant in every window (if the tool rotates in the well, the relative change in the rotation angle at every logging depth can be accounted for by using orientation measurements). In every window at every logging depth, the space of $(\phi, \psi, \theta)$ is partitioned into bins 403. This is done by incrementally changing the azimuth angle from 0° to 180°; incrementally changing the relative dip from 0° to 90°; and incrementally change the rotation angle from 0° to 360°. For every set of $\phi$, $\theta$, and $\psi$ the system of equations (11) is solved 405 by inverting for the unknown principal component measurements $\tilde{h}_{xx}$, $\tilde{h}_{yy}$, $\tilde{h}_{zz}$ using a least-square technique. The obtained values of $\phi$, $\theta$, $\psi$, $\tilde{h}_{xx}$, $\tilde{h}_{yy}$, $\tilde{h}_{zz}$ are put back into equation (11) and the synthetic values of multi-frequency focused responses $\tilde{h}$ (left side of equations (11)) are calculated 407. The misfit value of the measured and synthetic MFF components is calculated for every set of $\phi$, $\theta$, and $\psi$ and summed 409 for all logging depths in the window, and the one with the minimum value is selected 411. A check is made 413 to see if the additional windows remain for processing: if so, we go back to 401; if not, we proceed to further processing 413. To save time searching for the optimum set of angles, the method may be implemented in two steps. Initially a sparse grid of angles (large increments, such as 5 degrees) may be used, and when the approximate location of the minimum is established, a very limited area is searched with a dense grid (small increments, such as 0.5 degree). For each point in the grid $(\phi, \theta, \psi)$ we calculate , $\tilde{h}_{xx}$, $\tilde{h}_{yy}$, $\tilde{h}_{zz}$ at every depth. These principal components are used in the subsequent interpretation for $\sigma_x$, $\sigma_y$, and $\sigma_z$.

After the three angles and three principal components are determined, the next step of the processing is to recover the true formation resistivities. In the thick layer we can use either low frequency asymptotic expansions that reflect the relationship between principal components and principal conductivities, or use a look-up table that contains pre-calculated values of principal components for all possible combinations of principal conductivities. One embodiment of the disclosure uses a look-up table approach. To reduce the size of the look-up table the three formation conductivities are considered to be in decreasing order ($\sigma_x$ is the biggest). It is observed that in this case, the principal multi-frequency components are in the increasing order ($\tilde{h}_{xx}$ is the smallest). Also, the principal components are always converted to apparent conductivities and normalized by the biggest value $\sigma_{app}(\tilde{h}_{zz})$. These measures and the smoothness of the function allowed us to construct a very compact two-dimensional look-up table, that was calculated for $\sigma_x=1$, ten different values of $\sigma_x/\sigma_y$ (from 1 to 22.63), and ten similar values of $\sigma_x/\sigma_z$ (actually, due to the decreasing order of conductivities only upper triangle of this table is calculated and used). The calculations for the look-up table and for the following numerical tests were carried out.

Model 1. $\sigma_x=1$ S/m ($\rho_x=1$ Ohm-m), ($\sigma_y=0.5$ S/m ($\sigma_y=2$ Ohm-m), $\rho_y=0.125$ S/m ($\rho_z=8$ Ohm-m), $\phi=15°$, $\theta=45°$, $\psi=30°$.

To demonstrate the single frequency response we applied a skin-effect correction using all ten 3DEX frequencies and converted the results to apparent conductivities (S/m). The results in the tool coordinate system are presented below.

$$\hat{H} = \begin{pmatrix} 0.413 & -0.081 & -0.340 \\ -0.081 & 0.371 & 0.261 \\ -0.340 & 0.261 & 0.535 \end{pmatrix} \quad (12)$$

For comparison we also calculated the tool response in the principal coordinate system. The principal components of the magnetic matrix skin-effect corrected and normalized to apparent conductivity become $$\hat{H} = \begin{pmatrix} 0.509 & 0.017 & 0.141 \\ 0.017 & 0.338 & 0.018 \\ 0.141 & 0.018 & 0.442 \end{pmatrix} \quad (13)$$

We can see that the single frequency principle component matrix (13) has a structure similar to matrix (4) and this is due to the fact that the azimuth angle is relatively close to 0.

The tool response after multi-frequency focusing and normalized to apparent conductivity in the tool coordinate system is depicted below.

$$\hat{H}_{MFF} = \begin{pmatrix} 0.545 & -0.087 & -0.319 \\ -0.087 & 0.459 & 0.264 \\ -0.319 & 0.264 & 0.534 \end{pmatrix}. \quad (14)$$

We also applied the multi-frequency focusing to the modeled responses in the principal coordinate system. The multi-frequency focused principal components normalized to apparent conductivity become $$\hat{H}_{MFF} = \begin{pmatrix} 0.304 & -.001 & 0.014 \\ -0.001 & 0.470 & 0.006 \\ 0.014 & 0.006 & 0.716 \end{pmatrix}. \quad (15)$$

We can see that numerical results (15) agree with the theoretical equation (6) within numerical accuracy of calculation of the MFF components (all cross-components are close to zero). Moreover, we can notice that the increasing order of the principal diagonal components in matrix (15) correctly reflects the decreasing order of the true formation conductivities in this model, which is not the case for the single frequency components. The multi-frequency focused responses (14) were used as an input in the least-square optimization algorithm described above. The output from this code is presented below.

$\phi$=15.0000000000000
$\theta$=45.0000000000000
$\psi$=30.0000000000000
hh(1)=304.291155580850
hh(2)=469.790554564623
hh(3)=716.436188935103
$\chi^2$=0.239976438196083

We can see that all the angles and the principal components (hh(i), compare them with calculated principal components (15)) were recovered with high accuracy. The low $\chi^2$-misfit confirms the accuracy of the least-square inversion results.

The obtained principal components were then submitted in the algorithm for determining true formation resistivities described above. The results are presented below.
Rxx=0.999935529589632

Ryy=1.99987105917926
Rzz=7.99948423671706
χ²=3.601068608802229E-006

The recovered formation resistivities agree up to the fourth digit with the original formation resistivities. The high accuracy in this case indicates that the set of conductivities used in this exercise was also used in the look-up table (no interpolation was required).

The results of the processing may be recorded on a suitable medium. The results may further the used in the evaluation of exploration prospects. Specifically, those versed in the art would recognize that in typical sedimentary formations, the maximum resistivity is typically in a direction normal to the bedding plane. This phenomenon can occur due to thin layering of isotropic materials (resulting in transverse isotropy), and has been discussed, for example, in U.S. Pat. No. 6,711,502 to Mollison et al., having the same assignee as the present application and the contents of which are incorporated herein by reference.

Biaxial anisotropy may be the result of vertical fractures in a transversely isotropic medium wherein the fractures are filled with a material that has significant resistivity contrast with the surrounding medium. When such vertical fractures are filled with a hydrocarbon, there can be a significant reduction in conductivity in a direction normal to the fracture plane compared to the conductivity parallel to the fracture plane. Thus, determination of the parameters of the bi-axially symmetric medium can be useful in identification of hydrocarbons reserves. In addition, horizontal wells in such a vertically fractured medium, when drilled orthogonal to the fracture planes, can be highly productive. Thus, simply knowing the directions of principal resistivity is useful in reservoir evaluation and development.

The method of the disclosure has been described in terms of a wireline conveyed logging tool. The method may also be practiced in a measurement while drilling implementation using a logging tool conveyed on a bottomhole assembly. It is convenient to use the term "downhole assembly" to refer to a bottomhole assembly or to a string of instruments conveyed on wireline. It should further be noted that the method has been described above using nine components of a magnetic measurement tensor obtained using a tool having three transmitters and three receivers oriented either along the tool axis or orthogonal to the tool axis. The method may be used with an arbitrary orientation of transmitters and receivers as long as the measurements can be rotated to give the full nine components of the magnetic measurement tensor.

The processing described above may be implemented on a general purpose digital computer. As would be known to those versed in the art, instructions for the computer reside on a machine readable memory device such as ROMs, EPROMs, EAROMs, Flash Memories and Optical disks. These may be part of the computer or may be linked to the computer by suitable communication channels, and may be even at a remote location. Similarly, seismic data of the type discussed above may be stored on the computer or may be linked through suitable communication channels to the computer. The communication channels may include the Internet, enabling a user to access data from one remote location and get the instructions from another remote location to process the data. The instructions on the machine readable memory device enable the computer to access the multi-component data and process the data according to the method described above.

What is claimed is:

1. A method of evaluating a biaxially anisotropic earth formation, the method comprising:
   using an induction instrument conveyed in a borehole for making induction resistivity measurements at a plurality of frequencies; and
   using a processor for:
   (i) applying multifrequency focusing to the measurements at the plurality of frequencies to define elements of a tensor of multifrequency focused (MFF) measurements;
   (ii) processing the tensor of MFF measurements to obtain an estimate of (A) least one angle relating a tool-based coordinate system to a principal coordinate system of the earth formation, and (B) at least one conductivity of the biaxially anisotropic earth formation.

2. The method of claim 1 wherein using the processor for processing the tensor of MFF measurements further comprises inverting the tensor of MFF measurements to obtain the at least one angle and at least one principal component focused measurement.

3. The method of claim 2 wherein inverting the tensor of MFF measurements further comprises using a least squares minimization technique.

4. The method of claim 2 further comprising obtaining the at least one conductivity from the at least one principal component focused measurements by using a method selected from: (i) a table lookup, (ii) a low frequency expansion, and (iii) an inversion.

5. The method of claim 1 wherein defining elements of the tensor of MFF measurements further comprises:
   (i) performing a Taylor series expansion of the induction resistivity measurements, and
   (ii) selecting a component corresponding to a three-half power of frequency.

6. The method of claim 1 wherein processing the tensor of MFF measurements to obtain an estimate of the at least one angle further comprises obtaining an estimate of three angles, and processing the tensor of MFF measurements to obtain an estimate of the at least one conductivity comprises obtaining an estimate of three conductivities.

7. The method of claim 6 further comprising:
   (i) using the three angles to estimate a direction of fracturing of the earth formation, and
   (ii) drilling an additional well using the estimated direction of fracturing.

8. An apparatus configured to evaluate a biaxially anisotropic earth formation, the apparatus comprising:
   an induction resistivity instrument conveyed in a borehole, the instrument configured to make measurements at a plurality of frequencies; and
   a processor configured to:
   (A) apply multifrequency focusing to the measurements at the plurality of frequencies to define elements of a tensor of multifrequency focused (MFF) measurements;
   (B) process the tensor of MFF measurements to obtain an estimate of (A) least one angle relating a tool-based coordinate system to a principal coordinate system of the earth formation, and (B) at least one conductivity of the biaxially anisotropic earth formation.

9. The apparatus of claim 8 wherein the processor is configured to process the tensor of MFF measurements by further inverting the tensor of MFF measurements to obtain the at least one angle and at least one principal component focused measurement.

10. The apparatus of claim 9 wherein the processor is configured to invert the tensor of MFF measurements by further using a least squares minimization technique.

11. The apparatus of claim 9 wherein the processor is further configured to obtain the at least one conductivity from the at least one principal component focused measurements by using a method selected from: (i) a table lookup, (ii) a low frequency expansion, and (iii) an inversion.

12. The apparatus of claim 11 wherein the processor is further configured to:
(i) use the three angles to estimate a direction of fracturing of the earth formation.

13. The apparatus of claim 8 wherein the processor is configured to define elements of the tensor of MFF measurements by further:
(i) performing a Taylor series expansion of the induction resistivity measurements, and
(ii) selecting a component corresponding to a three-half power of frequency.

14. The apparatus of claim 8 wherein the processor is configured to obtain an estimate of the at least one angle by obtaining an estimate of three angles, and the processor is configured to obtain an estimate of the at least one conductivity by obtaining an estimate of three conductivities.

15. The apparatus of claim 8 wherein the induction resistivity instrument is part of one of: (i) a logging string conveyed on a wireline, and (ii) a bottomhole assembly conveyed on a drilling tubular.

16. A non-transitory computer-readable medium product having stored thereon instructions which when read by at least one processor causes the at least one processor to perform a method, the method comprising:
applying a multifrequency focusing to measurements made by an induction resistivity instrument conveyed in a borehole in a biaxially anisotropic medium at the plurality of frequencies to define elements of a tensor of multifrequency focused (MFF) measurements;
processing the tensor of MFF measurements to obtain an estimate of (A) least one angle relating a tool-based coordinate system to a principal coordinate system of the earth formation, and (B) at least one conductivity of the biaxially anisotropic earth formation.

17. The non-transitory computer-readable medium product of claim 16 further comprising at least one of (i) a ROM, (ii) an EPROM, (iii) an EAROM, (iv) a Flash Memory, and (v) an optical disk.

* * * * *